(12) United States Patent
Hwang (10) Patent No.: US 7,382,941 B2
(45) Date of Patent: Jun. 3, 2008

(54) APPARATUS AND METHOD OF COMPRESSING DYNAMIC RANGE OF IMAGE

(75) Inventor: Euihyeon Hwang, Bucheon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 511 days.

(21) Appl. No.: 11/088,911

(22) Filed: Mar. 25, 2005

(65) Prior Publication Data

US 2006/0078222 A1 Apr. 13, 2006

(30) Foreign Application Priority Data

Oct. 8, 2004 (KR) .............. 10-2004-0080581

(51) Int. Cl.
*G06K 9/56* (2006.01)
(52) U.S. Cl. .................................... 382/308
(58) Field of Classification Search ............. 345/587; 382/308

See application file for complete search history.

(56) References Cited

U.S. PATENT DOCUMENTS 7,218,324 B2 * 5/2007 Pfister et al. ............... 345/426

OTHER PUBLICATIONS

Greene et al., Error-Bounded Antialiased Rendering of Complex Environments, 1994, ACM Press, pp. 59-66.*
Crow, Summed-Area Tables for Texture Mapping, ACM Press, 1984, pp. 207-212.*
Jobson et al., "Properties And Performance Of A Center/Surround Retinex", *IEEE Transactions on Image Processing*, vol. 6, No. 3, Mar. 1997, pp. 451-462.
Moore et al., "A Real-Time Neural System For Color Constancy", *IEEE Transactions On Neural Networks*, vol. 2, No. 2, Mar. 1991.

* cited by examiner

*Primary Examiner*—Matthew C. Bella
*Assistant Examiner*—Dennis Rosario
(74) *Attorney, Agent, or Firm*—Stein, McEwen & Bui, LLP (57) ABSTRACT

An apparatus to compress a dynamic range of an image, and a method of compressing the dynamic range. The apparatus includes a periphery value production unit to calculate periphery information about peripheral pixels on a polyhedron-by-polyhedron basis using summed area tables produced form an analog pixel stream of a previous frame of the image, multiply the periphery information by predetermined weight values, sum results of the multiplications, and output the sum as a periphery value; and a pixel value correction unit to correct a pixel value of a target pixel included in an analog pixel stream of a current frame using the periphery value; wherein the peripheral pixels are located around the target pixel and included in the previous frame, and a kernel distribution expressed in a kernel function, which is a distribution of weight values dependent on locations of pixels included in the image, is approximated to a sum of the polyhedrons.

16 Claims, 6 Drawing Sheets

APPARATUS AND METHOD OF COMPRESSING DYNAMIC RANGE OF IMAGE

CROSS-REFERENCE TO RELATED APPLICATIONS

This application claims the benefit of Korean Patent Application No. 2004-80581, filed on Oct. 8, 2004, in the Korean Intellectual Property Office, the disclosure of which is incorporated herein by reference.

BACKGROUND OF THE INVENTION

1. Field of the Invention

The present invention relates to image processing performed in an image processing apparatus such as a camera cellular phone, digital camera, or camcorder, and, more particularly, to an apparatus and method of compressing a dynamic range of an image.

2. Description of the Related Art

When an image having a severe contrast is photographed using an image processing apparatus, for example, a digital camera, a camcorder, or the like, an image that is too bright or too dark is obtained. In other words, if a dynamic range of an image is large, an image different from what human eyes recognize is obtained by the image processing apparatus. The dynamic range of the image denotes a brightness range between the darkest and brightest parts of the image. If a person standing in front of a bright window is photographed by a camera, features recognized by human eyes are not captured by the camera, and instead a darkened person standing in front of a bright window is taken by the camera. This problem may be solved by performing postprocessing, similar to characteristics of a human eye, on a photographed image using a Retinex algorithm proposed by Edwin Land. However, the postprocessing is executed on an image that has already been digitally quantized, so a severely saturated part of the image is inevitably degraded in quality due to an error of quantization.

With widespread types of image processing apparatuses, interest in digital images continue to increase. However, many difficulties still remain for common users of these apparatuses, i.e., other than professional photographers, to have a good-quality image. When a human being or an object standing in front of a bright window is photographed inside a room, or an image is photographed with back light, an almost unrecognizable picture is obtained. This is not only because this photography deals with a digital image, but also because of a difference between image acquisition characteristics of a human eye and a camera. Fortunately, however, this difference in the case of digital images can be offset to some extent by postprocessing executed by a computer or the like.

To interpret an object, a human being recognizes the object not only through the eyes but also through the cerebral cortex that processes image information. This fact is well known by a theory called Retinex established through pioneer research by Edwin Land. Retinex is a compound word of a retina and a cortex. The core of the Retinex theory is that pixel values of an image landing on a camera are determined based on physical light amounts of pixels, whereas an image viewed by a human eye is recognized as a relative value corresponding to a ratio of a value of each pixel of an image to a brightness distribution around the pixel. This can be easily understood from a phenomenon in which a gray color looks darker to a human eye when the gray is on a white background than on a black background. Daniel J. Jobson, Zia-ur Rahman, Glenn A. Woodell, and others, who were researchers for NASA, established a theory known as "Multi Scale Retinex" through several related experiments and improvements based on the Retinex theory. The theory of "Multi Scale Retinex" was introduced by A. Moore, J. Allman, and R. M. Goodman, March 1991, in paper "A Real-time Neural System for Color Constancy", IEEE Trans. Neural Networks, vol. 2, pp. 237-247.

According to Retinex filtering as disclosed in the paper, a result of Gaussian filtering of a widely spread periphery is subtracted from a value of a center pixel value. A difference between the center and periphery values, instead of a ratio therebetween, is obtained because of log characteristics of the sense of sight, that is, a relationship of log(A/B)=log(A)–log(B), wherein two values are A and B. By using this method, a dark part of an image becomes brighter, and a bright part thereof becomes darker. For example, if an image having a pixel range of 0 to 255 between the darkest and brightest pixels is Retinex processed, the pixel range can be compressed into a range of about 40 to 200. A phenomenon in which a dynamic range of 0 to 255 is narrowed to a range of about 40 to 200 is referred to as a dynamic range compression.

In a printed image or a display, a variation of a scene reflectance recognizable by the human eye is usually in the range of 20:1 to 50:1 at most, whereas a variation, that is, a ratio, of the scene reflectance recognizable by a camera amounts to at least 2000:1. Due to this difference between the scene reflectance variations, when an image photographed by a camera is sampled to 8 bits and displayed, the displayed image is different from an image actually recognized by the human eye. The image which is different from the image actually recognized by the human eye, that is, a degraded image, can be prevented from being displayed by implementing Retinex as an analog circuit or by performing high-resolution analog-to-digital conversion (ADC) of 10-14 bits instead of 8 bits. If high-resolution ADC of 10-14 bits is used, a high-performance digital signal processor (DSP) is needed. Since a Retinex algorithm is basically based on a large-sized convolution, many calculations are needed, and the number of calculations increases in proportion to the number of pixels. Due to the continuing development of hardware, it is true that the performance of DSP's is also continuing to improve, but the resolution of images is also increasing commensurately. Hence, when Retinex processing depends on a DSP, the Retinex processing may be useful for still images, which can be processed by a digital camera relatively free from a time limit. However, the Retinex processing depending on a DSP causes a large amount of power consumption when real time processing and mobility are required, as in moving image photography by digital camcorders or recent digital cameras. As implemented by Glenn Hines and others, a 256×256 gray image can be processed at 20 frames per second using a 150 MHz floating point DSP. If the same DSP system processes a general VGA color image, the number of calculations needed significantly increases. Even when a summed area table (SAT) method or other optimization methods are introduced to reduce the number of needed calculations, it is difficult to cope with a wide variation of a scene reflectance when characteristics of a sensor are changed.

In an Analog-VLSI structure proposed by Andrew Moore and others, a degradation of an image is prevented by controlling a gain of the image prior to ADC. However, in this case, a resistive grid for obtaining a periphery value of a target pixel should be made to have a ratio similar to an image resolution, such that mass production may be hindered. In addition, a method of obtaining a periphery value of a target pixel is fixed, such that the Analog-VLSI structure has difficulty in having an improved structure, such as multi scale Retinex.

SUMMARY OF THE INVENTION

The present invention provides an apparatus to compress a dynamic range of an image through only multiplications and additions instead of a convolution.

The present invention also provides a method of compressing a dynamic range of an image through only multiplications and additions instead of a convolution.

Additional aspects and/or advantages of the invention will be set forth in part in the description which follows and, in part, will be obvious from the description, or may be learned by practice of the invention.

According to an aspect of the present invention, there is provided an apparatus to compress a dynamic range of an image, the apparatus including a periphery value production unit to calculate periphery information about peripheral pixels on a polyhedron-by-polyhedron basis using summed area tables produced from an analog pixel stream of a previous frame of the image, multiply the periphery information by predetermined weight values, sum results of the multiplications, and output the sum as a periphery value; and a pixel value correction unit to correct a pixel value of a target pixel that is included in an analog pixel stream of a current frame using the periphery value, and output a result of the correction; wherein the peripheral pixels are located around the target pixel and included in the previous frame, and a kernel distribution expressed in a kernel function, which is a distribution of weight values which depend on locations of pixels included in the image, is approximated to a sum of the polyhedrons.

According to another aspect of the present invention, there is provided a method of compressing a dynamic range of an image. The method includes calculating periphery information about peripheral pixels on a polyhedron-by-polyhedron basis using summed area tables produced from an analog pixel stream of a previous frame of an image, multiplying the periphery information by predetermined weight values, summing results of the multiplications, and determining the sum to be a periphery value; and correcting a pixel value of a target pixel that is included in an analog pixel stream of a current frame using the periphery value; wherein the peripheral pixels are located around the target pixel and included in the previous frame, and a kernel distribution expressed in a kernel function, which is a distribution of weight values which depend on locations of pixels included in the image, is approximated to a sum of the polyhedrons.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
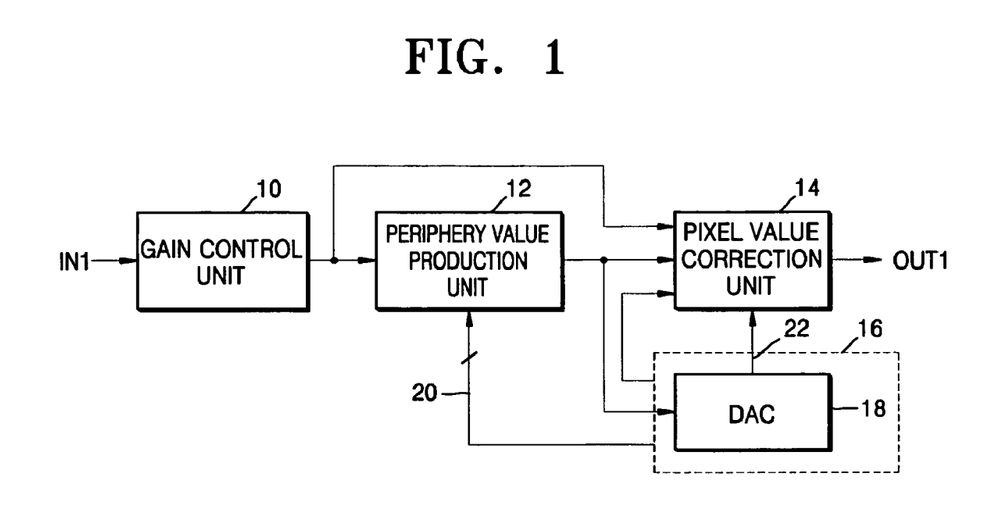
FIG. 1 is a block diagram of an apparatus to compress a dynamic range of an image, according to an embodiment of the present invention.

FIG. 1 is a block diagram of an apparatus to compress a dynamic range of an image, according to an embodiment of the present invention. The apparatus includes a gain control unit 10, a periphery value production unit 12, a pixel value correction unit 14, and a control unit 16.

Figure 2:
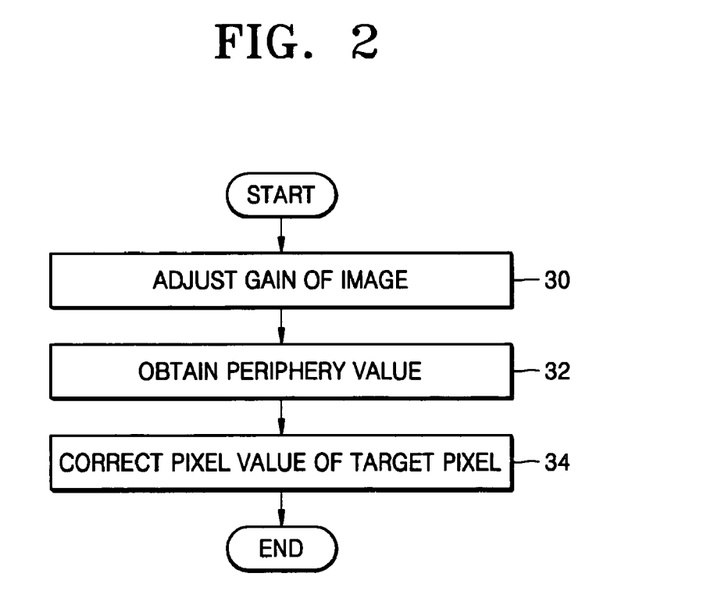
FIG. 2 is a flowchart illustrating a method of compressing a dynamic range of an image, according to an embodiment of the present invention.

FIG. 2 is a flowchart illustrating a method of compressing a dynamic range of an image, according to an embodiment of the present invention. This method comprises an operation of controlling a gain of the image (operation 30), an operation of obtaining a periphery value (operation 32), and an operation of correcting a pixel value of a target pixel (operation 34).

The gain control unit 10 controls the gain of the image depending on a brightness of the image, and outputs an analog pixel stream in which the controlled gain is reflected, in operation 30. More specifically, the gain control unit 10 receives an analog pixel stream, which is a result of a sensing of an image by an image sensor (not shown), from an external source via an input port IN1. The gain control unit 10 analyzes an overall brightness of the image from the analog pixel stream, controls the gain of the image according to a result of the analysis, reflects a result of the controlled gain in the analog pixel stream, and outputs the analog pixel stream in which the controlled gain is reflected. If the overall image is very bright, the gain control unit 10 may control the gain of the image so that the entire image becomes a bit darker. On the other hand, if the image is very dark, the gain control unit 10 may control the gain of the image so that the entire image becomes a bit brighter.

The gain control unit 10 may perform gamma compensation on the image.

According to another embodiment of the present invention, the apparatus of FIG. 1 may not include the gain control unit 10. In this case, the method of FIG. 2 subsequently may not include the operation 30, and the periphery value production unit 12 directly receives the analog pixel stream from the external source via the input port IN1.

However, in the case of FIG. 1, that is, when the dynamic range compressing apparatus includes the gain control unit 10, the gain control unit 10, the periphery value production unit 12, and the pixel value correction unit 14 may be formed into a single chip. In this case, the control unit 16 may also be incorporated into the single chip.

Although the dynamic range compressing apparatus of FIG. 1 includes the gain control unit 10 for convenience of explanation, the present invention is not limited thereto.

After the operation 30, the periphery value production unit 12 calculates periphery information about peripheral pixels on a polyhedron-by-polyhedron basis using summed area tables (SATs) (or integral images), multiplies the calculated periphery information by predetermined weight values, sums results of the multiplications, and outputs the summing result as the periphery value to the pixel value correction unit 14 and the control unit 16, in operation 32. At this time, the periphery value production unit 12 produces an SAT using an analog pixel stream of a previous frame received from the gain control unit 10. The SAT produced by the periphery value production unit 12 can be expressed as in Equation 1:

$$s(x,y)=s(x,y-1)+i(x,y)$$

$$ii(x,y)=ii(x-1,y)+s(x,y) \qquad (1)$$

wherein (x,y) denotes a location of a pixel included in the analog pixel stream of the previous frame, i(x,y) denotes a pixel value of the previous frame, s(x,y) denotes a result of a summing of pixel values of the previous frame in a vertical direction, and ii(x,y) denotes a result of a summing of the vertically summed pixel values of the previous frame in a horizontal direction. When y is 0, s(x,−1) is 0. When x is 0, ii(−1,y) is 0. The pixel value may be a brightness level or a gray level.

Figure 3:
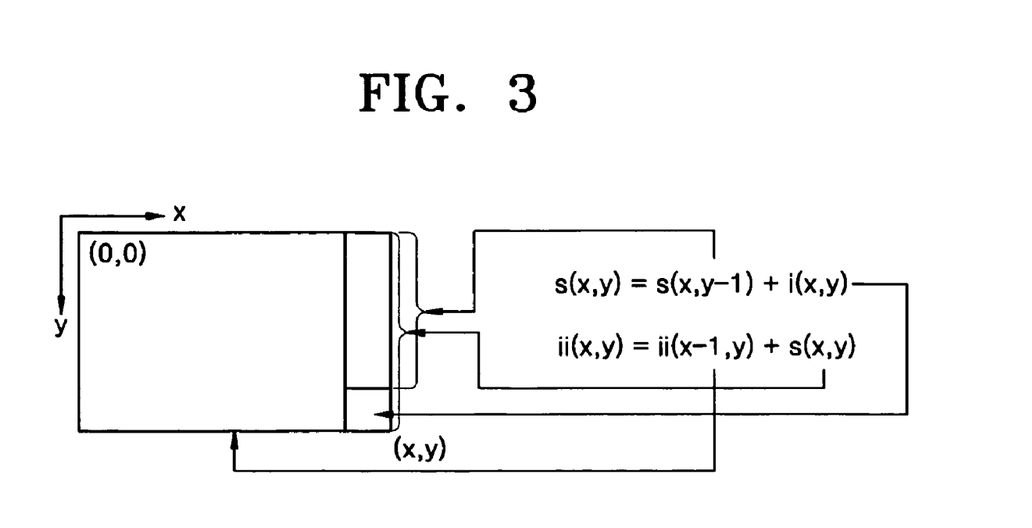
FIG. 3 is a schematic view of a previous frame to assist in an understanding of Equation 1.

FIG. 3 is a schematic view of the previous frame to assist in an understanding of Equation 1. Referring to FIG. 3, summation is executed in a direction from a left top corner to a right bottom corner of the previous frame to calculate values to be included in an SAT. However, the summation may be performed in a direction from the right bottom corner to the left top corner.

Figure 4A:
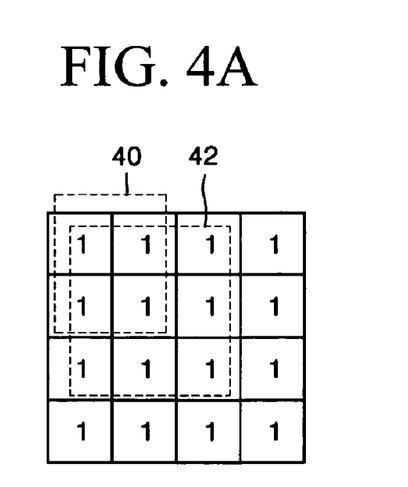
FIGS. 4A and 4B illustrate an analog pixel stream and a summed area table produced from the analog pixel stream.
Figure 4B:
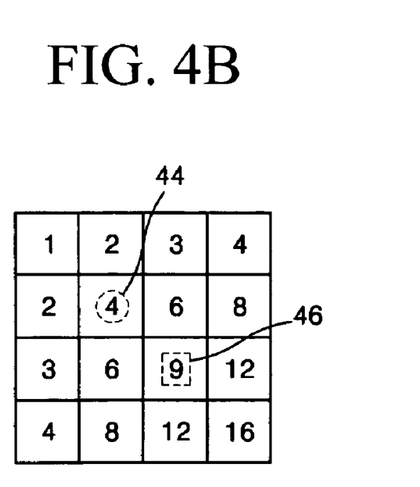

FIGS. 4A and 4B illustrate an analog pixel stream and an SAT produced from the analog pixel stream, respectively. The analog pixel stream is comprised of 9 pixels in FIG. 4A. A pixel value of each of the pixels may vary from 0 to 2n-1 (where n denotes a bit number in which a pixel value is expressed). For convenience' sake, the pixel value of each of the pixels is assumed to be 1. When four pixel values 40 from a left top corner of the analog pixel stream of FIG. 4A are summed, a value of 4 (which is indicated by reference numeral 44 in FIG. 4B) is obtained as shown in FIG. 4B. Similarly, when nine pixel values 42 from the left top corner of the analog pixel stream of FIG. 4A are summed, a value of 9 (which is indicated by reference numeral 46 in FIG. 4B) is obtained as shown in FIG. 4B. In this way, the periphery value production unit 12 transforms the analog pixel stream of the previous frame of FIG. 4A, received from the gain control unit 10, into the SAT of FIG. 4B.

The analog pixel stream output from the gain control unit 10 is input to the periphery value production unit 12 in a sequence from the left top corner of FIG. 4A to the right bottom corner thereof. The periphery value production unit 12 converts the analog pixel stream received from the gain control unit 10 into a digital bitstream, accumulates digital bitstreams line by line, and adds a result of the accumulation to a result of accumulation in an upper line, thereby producing an SAT.

The SAT is used to obtain a result of convolution performed in a conventional method of compressing a dynamic range of an image, and to achieve anti-aliasing upon texture mapping in a graphics field.

Hereinafter, a target pixel denotes a pixel which is a pixel of interest included in an analog pixel stream corresponding to a current frame output from the gain control unit 10, that is, a pixel having a value to be currently corrected. A peripheral pixel denotes a pixel which is located around the target pixel and included in a previous frame. In the present invention, a kernel distribution expressed in a kernel function, which is a distribution of weight values that is different depending on locations of the pixels included in an image, approximates to a sum of polyhedrons. The polyhedrons are determined so that the kernel distribution and the sum of the polyhedrons can be similar to each other without an undesirably large difference.

Each of the polyhedrons may be a rectangular solid, a cube, or the like. Examples of the kernel function are written by Daniel J Jobson, Zia-ur Rahman, and Glenn A. Woodell, "Properties and Performance of a Center/Surround Retinex", IEEE TRANSACTIONS ON IMAGE PROCESSING, Vol. 6, No. 3,1997, pp 451-462.

To facilitate understanding of the present invention, it is now assumed that a kernel function is a Gaussian function, a kernel distribution is a Gaussian distribution, and a polyhedron is a rectangular solid.

Figure 5:
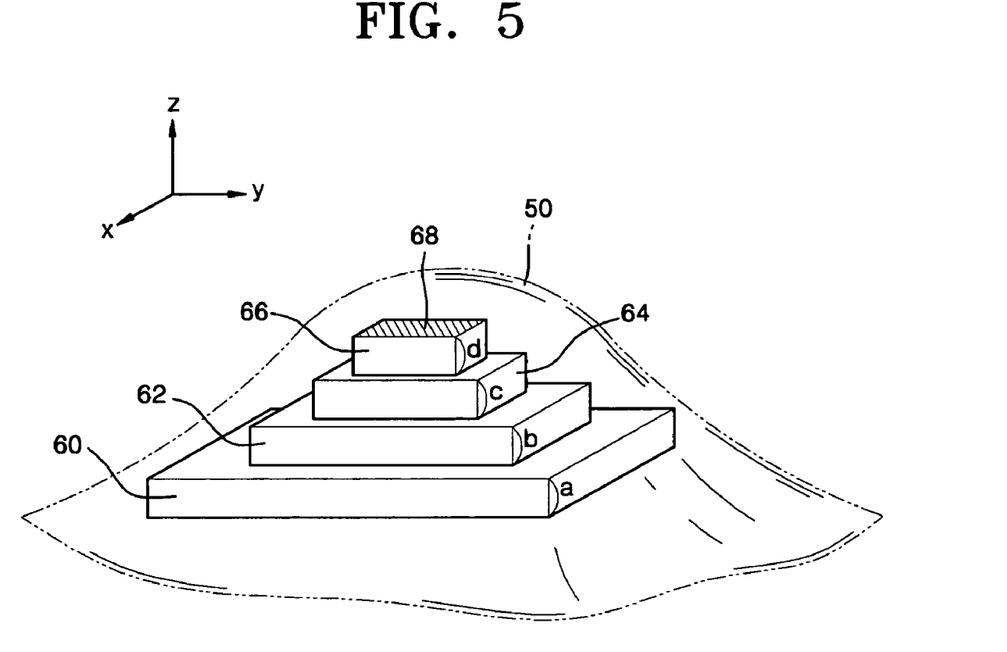
FIG. 5 illustrates an example of a Gaussian distribution having a circular shaped cross section in one plane.

FIG. 5 illustrates an example of a Gaussian distribution 50 having a circular shaped cross section in one plane, the plane being two-dimensional along coordinates x and y. In FIG. 5, (x,y) denotes a location of a pixel, and z denotes a weight value.

As shown in FIG. 5, it is assumed that the Gaussian distribution 50 is approximated to a sum of four rectangular solids 60, 62, 64, and 66. In this case, the periphery value production unit 12 multiplies periphery information about the rectangular solid 60 by a predetermined weight value a, periphery information about the rectangular solid 62 by a predetermined weight value b, periphery information about the rectangular solid 64 by a predetermined weight value c, and periphery information about the rectangular solid 66 by a predetermined weight value d. The predetermined weight values a, b, c, and d are empirically predetermined. In other words, the predetermined weight values a, b, c, and d are predetermined so as to minimize the difference between the kernel distribution and the sum of polyhedrons. The predetermined weight values a, b, c, and d may be numbers containing decimal fractions. In this case, the multiplication of periphery information by a predetermined weight value may be executed using a shift operation.

Thereafter, the periphery value production unit 12 sums the results of the multiplications and outputs a result of the summing as the periphery value. As shown in FIG. 5, the predetermined weight values a, b, c, and d are heights of the rectangular solids 60, 62, 64, and 66.

Periphery information about peripheral pixels included in each of the polyhedrons 60, 62, 64, and 66 may be a sum of pixel values of peripheral pixels belonging to an area of the polyhedron that is obtained using an SAT.

Figure 6:
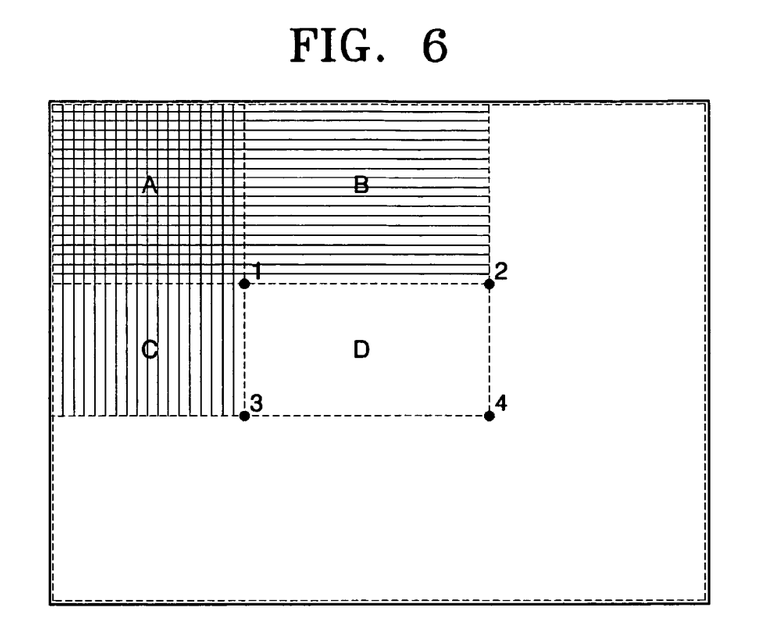
FIG. 6 illustrates a method of summing pixel values included in an arbitrary area using a sum area table.

Hereinafter, periphery information about a polyhedron will be described with reference to FIG. 6. FIG. 6 illustrates a method of summing pixel values included in an arbitrary area using an SAT. The arbitrary area matches with the SAT, and is comprised of areas A, B, C, and D.

The area D of FIG. 6 may be an area xy of each of the rectangular solids 60, 62, 64, and 66 of FIG. 5. For example, the area of the rectangular solid 66 of FIG. 5 is a hatched portion 68 of FIG. 5. The area of a polyhedron may be matched with an SAT. In other words, if FIG. 6 is an SAT, a value ii(1) at a point 1 of FIG. 6 is a sum of values of pixels included in area A, a value ii(2) at a point 2 of FIG. 6 is a sum of values of pixels included in areas A and B, a value ii(3) at a point 3 of FIG. 6 is a sum of values of pixels included in areas A and C, and a value ii(4) at a point 4 of FIG. 6 is a sum of values of pixels included in areas A, B, C, and D.

When peripheral pixels exist only in area D, a sum ΔD of pixel values of the pixels included in the area D is the periphery information about each of the polyhedrons 60, 62, 64, and 66. A sum of the pixel values of the pixels included in the area D of FIG. 6 can be calculated using Equation 2.

$$\Delta D = ii(4) + ii(1) - ii(2) - ii(3) \quad (2)$$

wherein ii(4), ii(3), ii(2), and ii(1) can be calculated using Equation 3:

$$ii(4) = \Delta A + \Delta B + \Delta C + \Delta D$$

$$ii(1) = \Delta A$$

$$ii(2) = \Delta A + \Delta B$$

$$ii(3) = \Delta A + \Delta C \quad (3)$$

wherein ΔA, ΔB, ΔC, and ΔD represent a sum of pixel values of pixels included in area A, B, C, or D, respectively.

Figure 7:
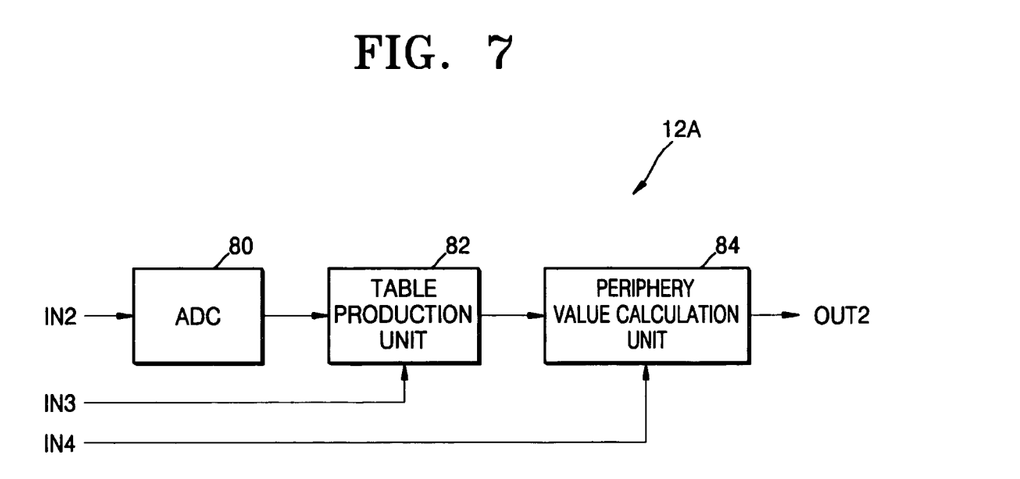
FIG. 7 is a block diagram of a periphery value production unit of FIG. 1, according to an embodiment of the present invention.

FIG. 7 is a block diagram of a periphery value production unit 12A, which is an embodiment of the periphery value production unit 12 of FIG. 1 according to the present invention. The periphery value production unit 12A is comprised of an analog-to-digital converter (ADC) 80, a table production unit 82, and a periphery value calculation unit 84.

The ADC 80 converts an analog pixel stream of a previous frame received from the gain control unit 10 via an input port IN2 into a digital pixel stream, and outputs the digital pixel stream to the table production unit 82. Even when the ADC 80 has a low resolution, instead of a high resolution, the ADC 80 with the low resolution does not affect the performance of the dynamic range compressing apparatus of FIG. 1, because the periphery value production unit 12A can sufficiently obtain a periphery value to be used to correct a value of the target pixel included in a current frame, even by using schematic information about the previous frame. For example, four bits are enough for the resolution of the ADC 80.

The table production unit 82 converts the digital pixel stream into an SAT, and outputs the SAT to the periphery value calculation unit 84.

The periphery value calculation unit 84 calculates periphery information for each polyhedron using each SAT produced by the table production unit 82, multiplies the periphery information by predetermined weight values, sums the results of the multiplications, and outputs the sum as a periphery value via an output port OUT2.

Figure 8:
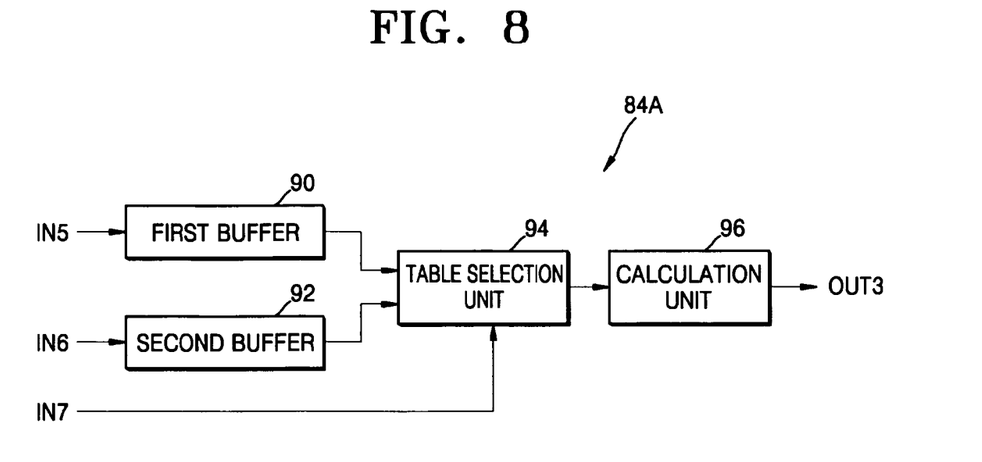
FIG. 8 is a block diagram of a periphery value calculator of FIG. 7, according to an embodiment of the present invention.

FIG. 8 is a block diagram of a periphery value calculation unit 84A, which is an embodiment of the periphery value calculation unit 84 of FIG. 7. The periphery value calculation unit 84A includes first and second buffers 90 and 92, a table selection unit 94, and a calculation unit 96.

The first and second buffers 90 and 92 of FIG. 8 double buffer the SATs produced by the table production unit 82. Double buffering indicates alternate storing of the SATs produced by the table production unit 82 in the first and second buffers 90 and 92 to solve a data bus problem induced between the table production unit 82 and the calculation unit 96. In other words, each SAT produced by the table production unit 82 is input either to the first buffer 90 via an input port IN5, or to the second buffer 92 via an input port IN6. To do this, the table production unit 82 writes the produced SATs in one of the first and second buffers 90 and 92 in response to a write control signal 20 of FIG. 1 received via an input port IN3. The control unit 16 of FIG. 1 generates the write control signal 20, and outputs the same to the table production unit 82.

Sizes of the first and second buffers 90 and 92 vary depending on the resolution of an image.

The table selection unit 94 selectively reads the SATs stored in the first and second buffers 90 and 92 in response to a selection control signal, and outputs the read-out SAT to the calculation unit 96. For example, an SAT may be selected by the table selection unit 94 by alternately reading the first and second buffers 90 and 92. To achieve this, the table selection unit 94 receives a selection control signal from the control unit 16 via an input port IN7. In other words, the periphery value calculation unit 84 of FIG. 7 receives the selection control signal 20 from the control unit 16 via an input port IN4. The control unit 16 of FIG. 1 generates the selection control signal 20, and outputs the same to the periphery value production unit 12.

The calculation unit 96 calculates periphery information for each polyhedron using an SAT selected by the table selection unit 94, multiplies calculated periphery information by predetermined weight values, sums the results of the multiplications, and outputs the sum as the periphery value via an output port OUT3.

As described above, the apparatus of FIG. 1 may further include the control unit 16 to control double buffering. In other words, the control unit 16 controls the double buffering using the write and selection control signals 20.

After operation 32, the pixel value correction unit 14 corrects a pixel value of a target pixel received from the gain control unit 10 using the periphery value received from the periphery value production unit 12, and outputs a corrected pixel value via an output port OUT1, in operation 34. A stream comprised of corrected values of target pixels output from the pixel value correction unit 14 corresponds to an image stream which has undergone conventional Retinex filtering. The stream output from the pixel value correction unit 14 is quantized into a digital stream. A resolution with which the stream of the pixel value correction unit 14 is quantized may be greater than a resolution of the ADC 80 of FIG. 7.

As described above, the control unit 16 does not only control double buffering, but also generates at least one of a correction control signal, an offset, and a gain to be output to the pixel value correction unit 14. The pixel value correction unit 14 corrects a value of a target pixel in response to the correction control signal received from the control unit 16, and controls an offset and a gain of the value of the target pixel in response to the offset and the gain, respectively, received from the control unit 16.

Referring to FIG. 1, the control unit 16 may include a digital-to-analog converter (DAC) 18, which converts a digital periphery value received from the periphery value calculation unit 84 of the periphery value production unit 12A of FIG. 7 into an analog periphery value 22, and outputs the analog periphery value 22 to the pixel value correction unit 14. The DAC 18 may be designed to have log characteristics, such as the log characteristics represented by $$\log \frac{F(x, y)}{I_i(x, y)}$$

disclosed in the previously mentioned paper entitled "Properties and Performance of a Center/Surround Retinex". Here, $$\frac{F(x, y)}{I_i(x, y)}$$

denotes a ratio of a digital target pixel F(x,y) to a digital periphery value li(x,y). The pixel value correction unit 14 corrects the value of the target pixel using the analog periphery value 22 received from the DAC 18 instead of using a periphery value received from the periphery value production unit 12.

At this time, a gain or an offset that is stored in the control unit 16 or supplied from an external source may be converted into an analog gain or offset by the DAC 18, and the analog gain or offset may be output to the pixel value correction unit 14.

Figure 9:
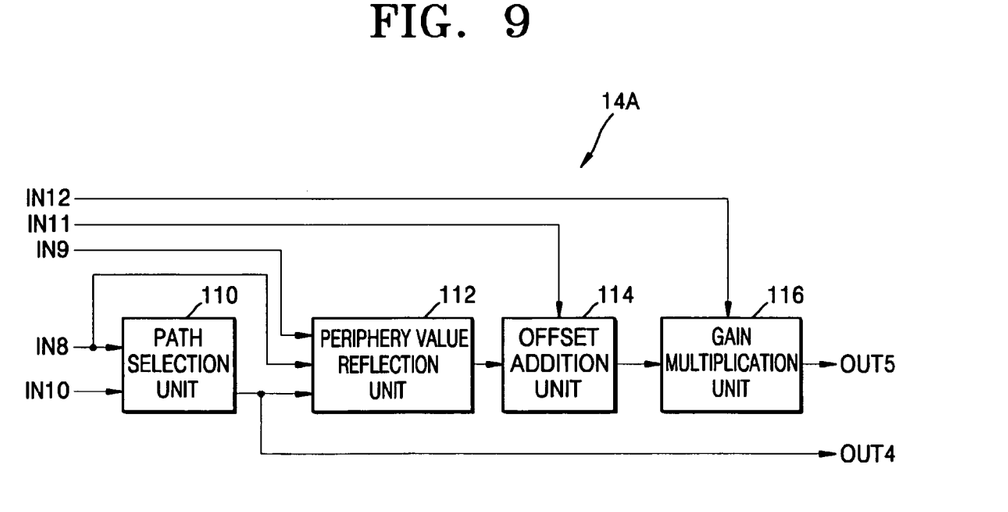
FIG. 9 is a block diagram of a pixel value correction unit of FIG. 1, according to an embodiment of the present invention.

FIG. 9 is a block diagram of a pixel value correction unit 14A, which is an embodiment of the pixel value correction unit 14 of FIG. 1 according to the present invention. The pixel value correction unit 14A includes a path selection unit 110, a periphery value reflection unit 112, an offset addition unit 114, and a gain multiplication unit 116.

In another embodiment of the present invention, the pixel value correction unit 14 of FIG. 1 may be comprised of only the periphery value reflection unit 112. The periphery value reflection unit 112 reflects a periphery value received via an input port IN9 in the value of the target pixel received from the gain control unit 10 of FIG. 1 via an input port IN8, and outputs a target pixel value in which the periphery value is reflected. Consequently, the corrected value of the target pixel corresponds to the target pixel value in which the periphery value is reflected.

Figure 10:
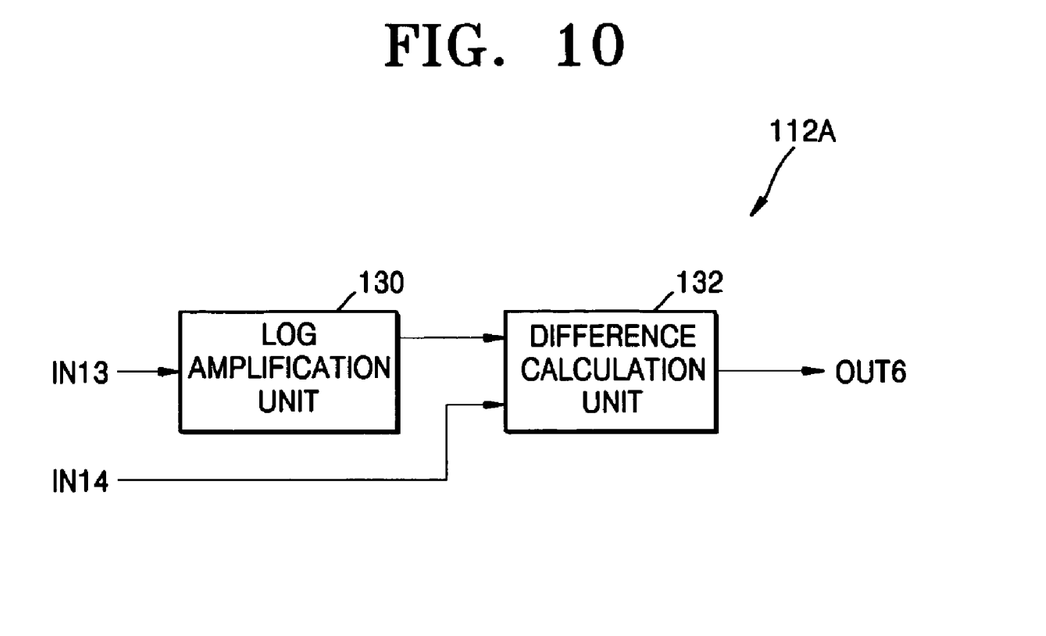
FIG. 10 is a block diagram of a periphery value reflection unit of FIG. 9, according to an embodiment of the present invention.

FIG. 10 is a block diagram of a periphery value reflection unit 112A, which is an embodiment of the periphery value reflection unit 112 of FIG. 9. The periphery value reflection unit 112A is comprised of a log amplification unit 130 and a difference calculation unit 132.

The log amplification unit 130 log-amplifies a pixel value of a target pixel received via an input port IN13 and outputs a result of the log amplification to the difference calculation unit 132. Log amplification denotes amplification which is not made at a linear rate, but in a log function. The difference calculation unit 132 calculates a difference between a log-amplified pixel value received from the log amplification unit 130 and a periphery value received via an input port IN14, and outputs the difference via an output port OUT6. Consequently, the corrected target pixel value corresponds to the difference calculated by the difference calculation unit 132.

Figure 11:
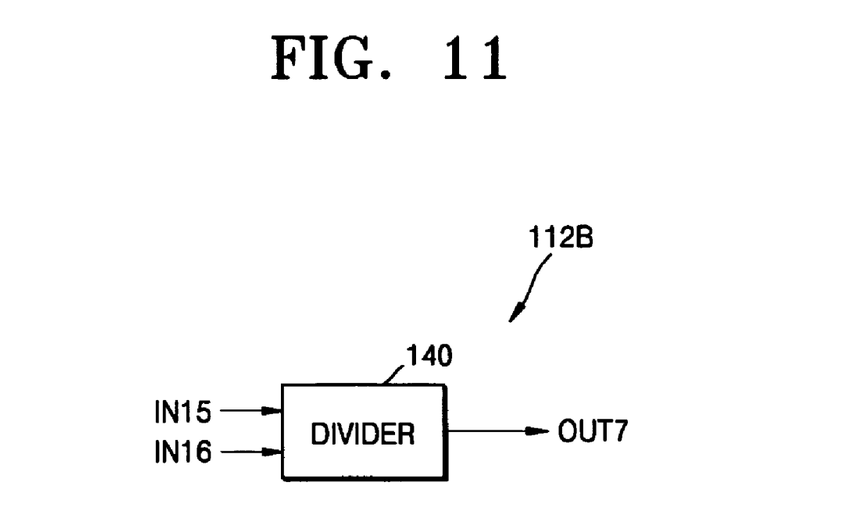
FIG. 11 is a block diagram of a periphery value reflection unit of FIG. 9, according to another embodiment of the present invention.

FIG. 11 is a block diagram of a periphery value reflection unit 112B, which is another embodiment of the periphery value reflection unit 112 of FIG. 9. The periphery value reflection unit 112B is comprised of a divider 140.

The divider 140 divides a pixel value of a target pixel received via an input port IN15 by a periphery value received via an input port IN16, and outputs a result of the division as the corrected target pixel value via an output port OUT7.

In another embodiment of the present invention, the pixel value correction unit 14 may further include the path selection unit 110. The path selection unit 110 bypasses the pixel value of the target pixel, in response to the correction control signal received from the control unit 16 via an input port IN10, via an output port OUT4. Alternatively, the path selection unit 110 outputs the pixel value of the target pixel to the periphery value reflection unit 112. For example, when recognizing from the correction control signal that a user requests a correction of the pixel value of the target pixel, the path selection unit 110 outputs the pixel value of the target pixel received via an input port IN8 to the periphery value reflection unit 112. On the other hand, when recognizing from the correction control signal that a user does not request a correction of the pixel value of the target pixel, the path selection unit 110 bypasses the pixel value of the target pixel received via an input port IN8 via the output port OUT4. To do this, the control unit 16 generates the correction control signal indicating whether the user requests a correction of a target pixel and outputs the correction control signal to the path selection unit 110. In this case, the periphery value reflection unit 112 receives the pixel value of the target pixel from the path selection unit 110, instead of receiving the same via the input port IN8.

In still another embodiment of the present invention, the pixel value correction unit 14 may further include at least one of the offset addition unit 114 and the gain multiplication unit 116.

Referring to FIG. 9, the offset addition unit 114 receives from the periphery value reflection unit 112 the target pixel value in which the periphery value has been reflected, adds the received target pixel value to an offset received from the control unit 16, via an input port IN11, and outputs a result of the addition to the gain multiplication unit 116. The gain multiplication unit 116 multiplies the addition result by a gain received from the control unit 16, via an input port IN12, and outputs a result of the multiplication via an output port OUT5. In this case, the corrected value of the target pixel corresponds to the result of the multiplication by the gain multiplication unit 116. In this way, a direct current level of the pixel value of the target pixel can be adjusted by controlling the offset, and a maximum or minimum value of the target pixel can be controlled by adjusting the gain. As a result, the brightness and contrast of the pixel value of the target pixel can be controlled using the offset and gain.

If the offset and the gain are 0 and 1, respectively, the target pixel value corrected by the periphery value reflection unit 112 reflecting the periphery value is output without change via the output port OUT5. In other words, although the offset addition unit 114 and the gain multiplication unit 116 are provided, the offset and gain of the pixel value of the target pixel may not be controlled.

In the above-described apparatus and method of compressing a dynamic range of an image, a pixel value of a target pixel included in a current frame is corrected using periphery information about periphery pixels included in a previous frame. As image differences between frames constituting an image are small, the pixel value of the target pixel can be corrected more readily in the present invention. For example, because a time difference between frames is 1/30 of a second, the image differences between frames may be considered small, except the case in which an image moves very fast.

The dynamic range compressing apparatus and method as described above may be used for all spectral bands. For example, if each pixel is represented in R, G, and B, three dynamic range compressing apparatuses of FIG. 1 may be used to respectively process the R, G, and B.

In a conventional apparatus and method of compressing the dynamic range of an image, a high-resolution ADC and a high-performance digital signal processing unit are needed to perform convolution that needs a large number of calculations for compressing the dynamic range of an image. However, in the apparatus and method of compressing the dynamic range of an image according to the present invention, the dynamic range of the image can be compressed while performing only three operations in the periphery value production unit 12, which are an addition to produce an SAT, multiplications of periphery information by weight values, and an addition of results of the multiplications, or further performing a shift operation required when a weight value is no more than a floating point, instead of performing convolution. Accordingly, the number of calculations decreases, so the compressing apparatus and method according to the present invention consumes less power than the conventional compressing apparatus and method, and consequently can be smoothly applied to moving-image processing apparatuses. Because periphery information is obtained using an SAT, the dynamic range of the image can be quickly compressed. Because a pixel value of a target pixel is corrected prior to quantization of an analog bitstream into a digital bitstream, a conventional problem in which a small difference between quantizations of colors is amplified is solved, thereby contributing to improving the quality of the image. Because the pixel value of the target pixel is controlled using an offset and a gain, a dynamic range of a sensor (not shown) which senses an image can be utilized to the physical limit of the sensor. Because different kernel distributions can be obtained by changing a kernel function, various periphery values can be obtained, and thus the pixel value of the target pixel can be corrected in various ways. Because the compressing apparatus according to the present invention can be implemented as a single chip including the gain control unit 10, the pixel value of an image can be corrected by simply replacing the single chip of the gain control unit 10 included in a conventional AGC (Automatic Gain Control) apparatus, so the conventional image processing circuit can be reused.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to compress a dynamic range of an image, the apparatus comprising:
    a periphery value production unit to calculate periphery information about peripheral pixels on a polyhedron-by-polyhedron basis using summed area tables produced from an analog pixel stream of a previous frame of the image, multiply the periphery information by predetermined weight values, sum results of the multiplications, and output the sum results as a periphery value; and
    a pixel value correction unit to correct a pixel value of a target pixel that is included in an analog pixel stream of a current frame using the periphery value, and output a result of the correction;
    wherein the peripheral pixels are located around the target pixel and included in the previous frame, and a kernel distribution expressed in a kernel function, which is a distribution of weight values which depend on locations of pixels included in the image, is approximated to a sum of the polyhedrons.

2. The apparatus of claim 1, further comprising a gain control unit to control a gain of the image according to a brightness of the image, and output an analog pixel stream in which the controlled gain has been reflected.

3. The apparatus of claim 2, wherein the gain control unit, the periphery value production unit, and the pixel value correction unit are provided on a single chip.

4. The apparatus of claim 1, wherein the summed area table is expressed as in the following equation:

$$s(x,y)=s(x,y-1)+i(x,y)$$

$$ii(x,y)=ii(x-1,y)+s(x,y)$$

wherein (x,y) denotes a location of a pixel included in a general table produced from the analog pixel stream of the previous frame, i(x,y) denotes a pixel value of the previous frame, s(x,y) denotes a result of a summing of pixel values of the previous frame in a vertical direction, ii(x,y) denotes a result of a summing of the vertically summed pixel values of the previous frame in a horizontal direction, and s(x,−1) and ii(−1, y) are 0.

5. The apparatus of claim 1, wherein the periphery value production unit comprises:
    an analog-to-digital converter to convert the analog pixel stream of the previous frame into a digital pixel stream and output the digital pixel stream;
    a table production unit to convert the digital pixel stream into the summed area table; and
    a periphery value calculation unit to calculate the periphery information for each of the polyhedrons using the summed area tables, multiply the periphery information by the predetermined weight values, sum the results of the multiplications, and output the sum as the periphery value.

6. The apparatus of claim 5, further comprising a control unit to generate at least one of a correction control signal, an offset, and a gain;
    wherein the pixel value correction unit corrects the pixel value of the target pixel in response to the correction control signal, and adjusts an offset and a gain of the pixel value of the target pixel in response to the offset and the gain generated by the control unit, respectively.

7. The apparatus of claim 6, wherein;
    the controller comprises a digital-to-analog converter to convert the periphery value, which is a digital value, received from the periphery value calculation unit into an analog periphery value, and output the analog periphery value to the pixel value correction unit; and
    the pixel value correction unit corrects the pixel value of the target pixel using the analog periphery value received from the digital-to-analog converter.

8. The apparatus of claim 7, wherein a result of correction by the pixel value correction unit is quantized into a digital signal.

9. The apparatus of claim 6, wherein the periphery value calculation unit comprises:

first and second buffers to double buffer the summed area tables;

a table selection unit to selectively read one of the summed area tables stored in the first and second buffers in response to a selection control signal; and a calculation unit to calculate the periphery information for each of the polyhedrons using the summed area table selected by the table selection unit, multiply the periphery information by the predetermined weight values, sum the results of the multiplications, and outputting the sum as the periphery value, wherein the table production unit writes the summed area tables to one of the first and second buffers in response to a write control signal, and the control unit generates the write control signal and the selection control signal.

10. The apparatus of claim 6, wherein the pixel value correction unit comprises a periphery value reflection unit to reflect the periphery value in the pixel value of the target pixel, and a result of the correction of the pixel value of the target pixel is the reflection of the periphery value in the pixel value of the target pixel by the periphery value reflection unit.

11. The apparatus of claim 10, wherein the periphery value reflection unit comprises:

a log amplification unit log to amplify the pixel value of the target pixel; and a difference calculation unit to calculate a difference between a result of the log amplification and the periphery value;

wherein the result of the correction of the pixel value of the target pixel is the difference calculated by the difference calculation unit.

12. The apparatus of claim 10, wherein the periphery value reflection unit comprises a divider to divide the pixel value of the target pixel by the periphery value, and the result of the correction of the pixel value of the target pixel is a result of the division by the divider.

13. The apparatus of claim 10, wherein the pixel value correction unit further comprises a path selection unit to bypass the pixel value of the target pixel in response to the correction control signal, or to output the pixel value of the target pixel to the periphery value reflection unit.

14. The apparatus of claim 10, wherein the pixel value correction unit further comprises:

an offset addition unit to add the result of the reflection by the periphery value reflection unit to the offset and output a result of the addition; and a gain multiplication unit to multiply the result of the addition by the offset addition unit by the gain, wherein the result of the correction of the pixel value of the target pixel is a result of the multiplication by the gain multiplication unit.

15. The apparatus of claim 1, wherein the polyhedrons are hexahedrons having areas and heights, the periphery information about the peripheral pixels included in each of the polyhedrons is a result of summation of pixel values of the peripheral pixels belonging to an area of each of the polyhedrons, the summation being performed using the summed area tables, and the weight values correspond to the heights of the polyhedrons.

16. A method of compressing a dynamic range of an image, the method comprising:

calculating periphery information about peripheral pixels on a polyhedron-by-polyhedron basis using summed area tables produced from an analog pixel stream of a previous frame of an image, multiplying the periphery information by predetermined weight values, summing results of the multiplications, and determining the sum results to be a periphery value; and correcting a pixel value of a target pixel that is included in an analog pixel stream of a current frame using the periphery value;

wherein the peripheral pixels are located around the target pixel and included in the previous frame, and a kernel distribution expressed in a kernel function, which is a distribution of weight values which depend on locations of pixels included in the image, is approximated to a sum of the polyhedrons.

* * * * *